United States Patent
Kanzaki

(12) 
(10) Patent No.: US 6,906,143 B2
(45) Date of Patent: Jun. 14, 2005

(54) PROPYLENE-ETHYLENE BLOCK COPOLYMER

(75) Inventor: Susumu Kanzaki, Kisarazu (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 10/436,252

(22) Filed: May 13, 2003

(65) Prior Publication Data

US 2004/0030052 A1 Feb. 12, 2004

(30) Foreign Application Priority Data

May 15, 2002 (JP) ........................................ 2002-139948
May 15, 2002 (JP) ........................................ 2002-139950

(51) Int. Cl.$^7$ ........................ C08L 23/10; C08L 23/12; C08L 23/04
(52) U.S. Cl. ........................................ 525/240; 525/323
(58) Field of Search .................................. 525/240, 323

(56) References Cited

U.S. PATENT DOCUMENTS 5,856,400 A * 1/1999 Matsumura et al. ........ 524/525

FOREIGN PATENT DOCUMENTS

| JP | 07-157626 A | 6/1995 |
| JP | 07-157627 A | 6/1995 |
| JP | 09-048831 A | 2/1997 |
| JP | 09-067501 A | 3/1997 |

* cited by examiner

*Primary Examiner*—James J. Seidleck
*Assistant Examiner*—Olga Asinovsky
(74) *Attorney, Agent, or Firm*—Sughrue Mion, PLLC

(57) ABSTRACT

Disclosed is a propylene-ethylene block copolymer which is superior in stiffness, hardness and moldability and also in balance between toughness and low-temperature impact resistance. The copolymer contains from 60 to 85% by weight of a crystalline polypropylene portion and from 15 to 40% by weight of a specific propylene-ethylene random copolymer portion, wherein the propylene-ethylene block copolymer has a melt flow rate (MFR) of from 5 to 120 g/10 min.

5 Claims, No Drawings

PROPYLENE-ETHYLENE BLOCK COPOLYMER

BACKGROUND OF THE INVENTION

1. Field of the Invention

The present invention relates to a propylene-ethylene block copolymer and to a molded article made of the same. More particularly, the invention relates to a propylene-ethylene block copolymer which is superior in stiffness, hardness and formability and also in balance between toughness and low-temperature impact resistance when being fabricated into a molded article and to a molded article made of the same.

2. Description of the Related Art

Polypropylene resin compositions are materials superior in stiffness, impact resistance and the like and are in use for wide range of applications in the form of molded articles, e.g. automotive interior and exterior parts and housings of electric components. It is well known that, among such polypropylene resin compositions, those comprising propylene-ethylene block copolymers, for example, polypropylene resin compositions comprising a propylene-ethylene block copolymer and a propylene homopolymer or a polypropylene resin composition comprising two or more kinds of different propylene-ethylene block copolymers are suitably used due to their superior stiffness, impact resistance and the like.

For example, JP-A-7-157626 discloses a thermoplastic resin composition comprising a propylene-ethylene block copolymer obtainable by multi-stage polymerization and a polyolefin rubber. As the propylene-ethylene block copolymer, used is one comprising a propylene ethylene block copolymer which contains a propylene-ethylene random copolymer phase having an ethylene content of from 5 to 50% by weight and also having an intrinsic viscosity of from 4.0 to 8.0 dl/g and a propylene-ethylene block copolymer having an ethylene content of more than 50% by weight but not more than 98% by weight and also having an intrinsic viscosity of not less than 2.0 dl/g but less than 4.0 dl/g. The publication also discloses that a thermoplastic resin composition with an extremely great ductility is obtained.

JP-A-7-157627 discloses a thermoplastic resin composition comprising a propylene-ethylene block copolymer obtainable by multi-stage polymerization and a polyolefin rubber. As the propylene-ethylene block copolymer, used is one comprising a propylene-ethylene block copolymer which contains a propylene-ethylene random copolymer phase having an intrinsic viscosity of from 4.0 to 8.0 dl/g and a propylene-ethylene block copolymer having an intrinsic viscosity of not less than 2.0 dl/g but less than 4.0 dl/g, with the proviso that that a propylene-ethylene block copolymer which contains a propylene-ethylene random copolymer phase having an intrinsic viscosity of from 4.0 to 8.0 dl/g and also having an ethylene content of from 5 to 50% by weight and a propylene-ethylene block copolymer having an intrinsic viscosity of not less than 2.0 dl/g but less than 4.0 dl/g and also having an ethylene content of more than 50% by weight but not more than 98% by weight are excluded. The publication also discloses that a thermoplastic resin composition with an extremely great ductility is obtained.

Moreover, JP-A-9-48831 discloses a propylene-ethylene block copolymer superior in impact resistance, stiffness and moldability which is obtained by multi-stage polymerization, the block copolymer comprising (a) from 60 to 96% by weight of homopolypropylene portion having a melt flow rate (MFR), as determined according to ASTM D-1238, of from 1 to 1000 g/10 min and satisfying the relationship $\Delta Hm \geq 24.50 + 1.583 \log MFR$ wherein $\Delta Hm$ is heat of fusion determined by differential scanning calorimetry, (b) from 2 to 38% by weight of a propylene-ethylene copolymer portion of lower ethylene having an ethylene content of from 20 to 50% by weight and an intrinsic viscosity of from 2 to 5 dl/g, and (c) from 2 to 38% by weight of propylene-ethylene copolymer portion of higher ethylene content having an ethylene content of from 50 to 90% by weight and an intrinsic viscosity of from 3 to 6 dl/g.

However, even in the propylene-ethylene block copolymer described in the above-cited published patent applications, further improvement in stiffness, hardness, moldability and also in balance between toughness and low-temperature impact resistance has been awaited.

SUMMARY OF THE INVENTION

The object of the present invention is to provide a propylene-ethylene block copolymer which is superior in stiffness, hardness and moldability and also is superior in balance between toughness and low-temperature impact resistance when being molded and to provide a molded article made of the same.

In a first aspect, the present invention provides a propylene-ethylene block copolymer comprising:

from 60 to 85% by weight of a crystalline polypropylene portion which is a propylene homopolymer or a copolymer of propylene and up to 1 mol % of ethylene or α-olefin having 4 or more carbon atoms, and from 15 to 40% by weight of a propylene-ethylene random copolymer portion with a propylene to ethylene weight ratio (propylene/ethylene) of from 75/25 to 35/65, wherein the propylene-ethylene block copolymer satisfies at least one of requirements (1-1) and (1-2) below:

Requirement (1-1): The propylene-ethylene random copolymer portion comprises two kinds of propylene-ethylene random copolymer components (EP-A) and (EP-B), wherein the copolymer component (EP-A) has an intrinsic viscosity $[\eta]_{EP-A}$ of not less than 1.5 dl/g but less than 4 dl/g and an ethylene content $[(C2')_{EP-A}]$ of not less than 20% by weight but less than 50% by weight, and wherein the copolymer component (EP-B) has an intrinsic viscosity $[\eta]_{EP-B}$ of not less than 0.5 dl/g but less than 3 dl/g and an ethylene content $[(C2')_{EP-B}]$ of not less than 50% by weight and not more than 80% by weight.

Requirement (1-2): The content of the propylene-ethylene random copolymer portion (EP-cont.), the ethylene content in the propylene-ethylene random copolymer portion $[(C2')_{EP}]$ and the volume-average equivalent circular diameter $(D_v)$ of dispersed particles which are formed when the propylene-ethylene block copolymer is molded and which correspond to the propylene-ethylene random copolymer portion satisfy the following formula (I):

$$D_v \leq -1.7 + 0.032 \times [(C2')_{EP}] + 0.082 \times (EP\text{-cont.}) \qquad (I)$$

and also satisfies requirement (2) below:

Requirement (2): The propylene-ethylene block copolymer has a melt flow rate (MFR) of from 5 to 120 g/10 min.

In a second aspect, the present invention relates to a molded article made of the propylene-ethylene block copolymer mentioned above.

DESCRIPTION OF PREFERRED EMBODIMENTS

The propylene-ethylene block copolymer of the present invention is one which contains from 60 to 85% by weight of a crystalline polypropylene portion which is a propylene homopolymer or a copolymer of propylene and up to 1 mol % of ethylene or α-olefin having 4 or more carbon atoms and from 15 to 40% by weight of a propylene-ethylene random copolymer portion with a weight ratio of propylene to ethylene (propylene/ethylene) of from 75/25 to 35/65. Hereafter, this propylene-ethylene random copolymer portion may be referred to as EP portion.

When the amount of the crystalline polypropylene portion is less than 60% by weight (in other words, when the amount of the propylene-ethylene random copolymer portion (EP portion) exceeds 40% by weight), the stiffness or hardness may fail or the melt flow rate (MFR) may fail and no satisfactory molded article may be obtained. On the other hand, when the amount of the crystalline polypropylene portion exceeds 85% by weight (in other words, when the amount of the EP portion is less than 15% by weight), the toughness or impact resistance may fail.

The crystalline polypropylene portion in the propylene-ethylene block copolymer of the present invention is a crystalline polypropylene which is a propylene homopolymer or a copolymer of propylene and up to 1 mol % of ethylene or α-olefin having 4 or more carbon atoms. When the content of ethylene or a-olefin having 4 or more carbon atoms exceeds 1 mol %, the stiffness, heat resistance or hardness may fail.

In view of stiffness, heat resistance or hardness, propylene homopolymers are preferable and those having isotactic pentad fractions, as determined by $^{13}$C-NMR, of 0.95 or more are more preferable. The isotactic pentad fraction is a fraction of propylene monomer units existing at the center of an isotactic chain in the form of a pentad unit, in other words, the center of a chain in which five propylene monomer units are meso-bonded successively, in the polypropylene molecular chain as measured by a method disclosed in A. Zambelli et al., Macromolecules, 6, 925 (1973), namely, by use of $^{13}$C-NMR. (It should be noted that the assignment of NMR absorption peaks was conducted based on Macromolecules, 8, 687 (1975) published thereafter.)

Specifically, the isotactic pentad fraction was measured as an area fraction of mmmm peaks in all absorption peaks in the methyl carbon region of a $^{13}$C-NMR spectrum. According to this method, the isotactic pentad fraction of an NPL standard substance, CRM No. M19-14 Polypropylene PP/MWD/2 available from NATIONAL PHYSICAL LABORATORY, G.B. was measured to be 0.944.

The intrinsic viscosity $[\eta]_P$ of the crystalline polypropylene portion in the propylene-ethylene block copolymer of the present invention is preferably up to 1.5 dl/g from the viewpoint of the balance between flowability during melting and toughness of molded articles. The Q value, which is a molecular weight distribution (Mw/Mn) measured by gel permeation chromatography (GPC), is preferably not less than 3 but less than 7, more preferably from 3 to 5.

The propylene-ethylene random copolymer portion (EP portion) in the propylene-ethylene block copolymer of the present invention has a propylene to ethylene weight ratio (propylene/ethylene) of from 75/25 to 35/65, preferably from 70/30 to 40/60. When the propylene to ethylene weight ratio is out of the above ranges, a satisfactory impact resistance may not be obtained.

It is preferable that the EP portion in the propylene-ethylene block copolymer of the present invention be composed of a propylene-ethylene random copolymer component (EP-A) having a relatively low ethylene concentration and a propylene-ethylene random copolymer component (EP-B) having a relatively high ethylene concentration.

The ethylene content $[(C2')_{EP-A}]$ of the propylene-ethylene random copolymer component (EP-A) having a relatively low ethylene concentration is not less than 20% by weight but less than 50% by weight, preferably from 25 to 45% by weight. When the ethylene content $[(C2')_{EP-A}]$ is out of the above ranges, a mechanical properties, e.g. toughness and impact resistance, may fail.

The intrinsic viscosity $[\eta]_{EP-A}$ of the propylene-ethylene random copolymer component (EP-A) having a relatively low ethylene concentration is not less than 1.5 dl/g but less than 4 dl/g, preferably not less than 2 dl/g but less than 4 dl/g. When the intrinsic viscosity $[\eta]_{EP-A}$ is less than 1.5 dl/g, the stiffness or hardness may fail or the toughness or impact resistance may also fail. When the intrinsic viscosity $[\eta]_{EP-A}$ is 4 dl/g or more, many pimples may be formed in a molded articles or, in a propylene-ethylene block copolymer containing much EP portion, the melt flow rate (MFR) of the whole propylene-ethylene block copolymer may become low, resulting in a low flowability.

The ethylene content $[(C2')_{EP-B}]$ of the propylene-ethylene random copolymer component (EP-B) having a relatively high ethylene concentration is from 50 to 80% by weight, preferably from 55 to 75% by weight. When the ethylene content $[(C2')_{EP-B}]$ is out of the above ranges, a mechanical property balance, e.g. impact resistance at low temperature, may fail.

The intrinsic viscosity $[\eta]_{EP-B}$ of the propylene-ethylene random copolymer component (EP-B) having a relatively high ethylene concentration is not less than 0.5 dl/g but less than 3 dl/g, preferably not less than 1 dl/g but less than 3 dl/g. When the intrinsic viscosity $[\eta]_{EP-B}$ is less than 0.5 dl/g, the stiffness or hardness may fail or the toughness or impact resistance may also fail. When the intrinsic viscosity $[\eta]_{EP-B}$ is 3 dl/g or more, the toughness or impact resistance may fail. In addition, in a propylene-ethylene block copolymer containing much EP portion, the melt flow rate (MFR) of the whole propylene-ethylene block copolymer may become low, resulting in a low flowability.

On the other hand, it is preferable that in the EP portion in the propylene-ethylene block copolymer of the present invention, the content of that portion (EP-cont.), the ethylene content in the portion $[(C2')_{EP}]$ and the volume-average equivalent circular diameter $(D_v)$ of dispersed particles which are formed when the propylene-ethylene block copolymer is molded and which correspond to the propylene-ethylene random copolymer portion satisfy the following formula (I):

$$D_v \leq -1.7 + 0.032 \times [(C2')_{EP}] + 0.082 \times (EP\text{-cont.}) \qquad (I)$$

When $D_v$ exceeds $-1.7+0.032\times[(C2')_{EP}]+0.082\times(EP\text{-cont.})$, the toughness or low-temperature impact resistance may be deteriorated.

The volume-average equivalent circular diameter $(D_v)$ is determined by subjecting a transmission electron microphotograph of an ultrathin section cut out from a hot-press molded article to image analysis.

The above formula (I) was derived in the following way.

It is believed that a reduction in the dispersed particle diameter of an EP portion is effective for improving the balance between toughness and impact resistance. In general, an increase in the content of an EP portion (EP-cont.) can result in an increase in both toughness and impact resistance, but, at the same time, stiffness is lowered. An approach for enhancing the stiffness and improving the balance between stiffness, toughness and impact resistance could be a reduction in EP portion content (EP-cont.) to control the ethylene content [(C2')$_{EP}$] in the EP portion. However, when the ethylene content [(C2')$_{EP}$] is too large, a dispersed particle diameter will also become large and a satisfactory toughness and impact resistance are not necessarily obtained. Moreover, when the EP-cont. is large, the EP portion may agglomerate to increase the dispersed particle diameter. Therefore, satisfactory toughness and impact resistance are not necessarily obtained. In other words, it is clear that there is a correlation between the content (EP-cont.) of an EP portion, the ethylene content [(C2')$_{EP}$] and the dispersed particle diameter and that an appropriate relation between those factors is required for obtaining a propylene-ethylene block copolymer superior in balance between stiffness, toughness and impact resistance.

The present inventors studied the below-tabulated propylene-ethylene block copolymers (cases 1–19) differing in the content (EP-cont.) of an EP portion, the ethylene content [(C2')$_{EP}$] and the dispersed particle diameter. It was found that cases 1 to 10 were superior in the balance between Rockwell hardness, tensile elongation and Izod impact strength, whereas cases 11 to 19 were poor in the balance between Rockwell hardness, tensile elongation and Izod impact strength.

| case | [η] P | [η] EP | C'2/EP (wt %) | EPcont. (wt %) | Dv (μm) | Correspondence with Examples and Comparative Examples |
|---|---|---|---|---|---|---|
| 1 | 1.47 | 2.2 | 38.8 | 29.4 | 1.7 | Example-5 |
| 2 | 1.47 | 2.2 | 38.8 | 21.8 | 1.3 | Example-2 |
| 3 | 1.36 | 2.1 | 40.4 | 28.9 | 1.9 | |
| 4 | 1.39 | 2.1 | 40.4 | 23.1 | 1.4 | |
| 5 | 1.37 | 2.6 | 53.7 | 22.9 | 1.8 | Example-1 |
| 6 | 1.44 | 2.6 | 53.7 | 10.1 | 0.9 | |
| 7 | 1.32 | 2.5 | 50.1 | 24.4 | 1.5 | |
| 8 | 1.24 | 2.7 | 48.0 | 22.3 | 1.6 | Example-3 |
| 9 | 1.39 | 2.3 | 42.4 | 34.7 | 2.7 | |
| 10 | 1.43 | 2.3 | 42.4 | 22.9 | 1.5 | Example-4 |
| 11 | 1.27 | 1.9 | 43.4 | 29.8 | 2.3 | Comparative Example-7 |
| 12 | 1.33 | 1.9 | 43.4 | 22.9 | 1.9 | Comparative Example-4 |
| 13 | 1.35 | 2.2 | 24.7 | 42.7 | 2.7 | |
| 14 | 1.43 | 2.2 | 24.7 | 23.0 | 1.3 | Comparative Example-1 |
| 15 | 1.30 | 2.1 | 44.0 | 26.7 | 2.7 | Comparative Example-5 |
| 16 | 1.33 | 2.1 | 44.0 | 23.0 | 2.0 | Comparative Example-2 |
| 17 | 1.42 | 2.1 | 44.0 | 10.1 | 0.9 | |
| 18 | 1.40 | 2.4 | 57.4 | 28.7 | 4.9 | Comparative Example-6 |
| 19 | 1.42 | 2.4 | 57.4 | 23.0 | 2.8 | Comparative Example-3 |

A linear multiple regression analysis for the propylene-ethylene block copolymers (cases 1 to 10) which are superior in the balance between Rockwell hardness, tensile elongation and Izod impact strength resulted in the following relation:

$$Dv = -1.79484 + 0.032407 \times [(C2')_{EP}] + 0.081803 \times (EP\text{-cont.})$$

(coefficients of correlation: r=0.93709065, r$^2$=0.87813890)

Next, the intercept was corrected for obtaining a threshold between those copolymers and the propylene-ethylene block copolymers (cases 11 to 19) poor in the balance between Rockwell hardness, tensile elongation and Izod impact resistance, resulting in the following formula (I):

$$Dv = -1.7 + 0.032 \times [(C2')_{EP}] + 0.082 \times (EP\text{-cont.}) \quad (I)$$

The melt flow rate (MFR) of the propylene-ethylene block copolymer of the present invention is from 5 to 120 g/10 min, preferably from 10 to 100 g/10 min. When an MFR is less than 5 g/10 min, the moldability may be poor or the effect of preventing generation of flowmarks may be insufficient. When an MFR exceeds 120 g/10 min, the impact resistance may fail.

A method for producing the propylene-ethylene block copolymer of the present invention may be a production method using a known polymerization technique and a catalyst system composed of (a) a solid catalyst component containing magnesium, titanium, halogen and an electron donor as essential components, (b) an organoaluminum compound and (c) an electron donating component. A method for producing such a catalyst is described in detailed in, for example, JP-A-1-319508, JP-A-7-216017, and JP-A-10-212319.

A polymerization method applicable for the preparation of the propylene-ethylene block copolymer of the present invention may be, for example, bulk polymerization, solution polymerization, slurry polymerization, and gas phase polymerization. These polymerization methods may be performed in a batch mode or a continuous mode. In addition, these polymerization methods may be combined arbitrarily. A specific production method is a polymerization method in which at least two polymerization reactors are arranged tandem. In this method, a crystalline polypropylene portion is produced by polymerization in the presence of the aforementioned catalyst system comprising (a) solid catalyst component, (b) organoaluminum compound and (c) electron donating component. The reaction mixture is then transferred to a next polymerization reactor, in which reactor a propylene-ethylene random copolymer portion is produced by the successive polymerization. From the industrial and economic viewpoint, preferred is a continuous gas-phase polymerization.

In the above-mentioned polymerization method, the amounts of (a) solid catalyst component, (b) organoaluminum compound and (c) electron donating component to be used and the method of feeding these catalyst components to polymerization reactors can be determined properly.

The polymerization temperature is usually from −30 to 300° C., preferably from 20 to 180° C. The polymerization pressure is usually from normal pressure to 10 MPa, preferably from 0.2 to 5 MPa. As a molecular weight regulator, hydrogen can be employed, for example.

In the production of the propylene-ethylene block copolymer of the present invention, a preliminary polymerization for preventing deterioration of a catalyst may be carried out in a known manner prior to the main polymerization. An example of a known method of preliminary polymerization is a method in which polymerization is carried out in a slurry state using a solvent while feeding a small amount of propylene in the presence of (a) solid catalyst component and (b) organoaluminum compound.

To the propylene-ethylene block copolymer of the present invention, various kinds of additives may be added as needed. Examples of the additives include antioxidants, ultraviolet absorbers, lubricants, pigments, antistatic agents, copper inhibitors, flame retarders, neutralizing agents, foaming agents, plasticizers, nucleating agents, foam inhibitors, and crosslinking agents. Of these additives, it is preferable to add an antioxidant and an ultraviolet absorber for the purpose of improving heat resistance, weatherability and stability against oxidation.

The propylene-ethylene block copolymer of the present invention may be used alone or may alternatively be used in the form of a composition resulting from compounding of an elastomer and an inorganic filler to the propylene-ethylene block copolymer of the present invention. When compounding an elastomer and an inorganic filler, preferred is a composition containing from 35 to 98% by weight of the propylene-ethylene block copolymer of the present invention, from 1 to 35% by weight of the elastomer, and from 1 to 30% by weight of the inorganic filler, provided that the total weight of the composition is 100% by weight.

The elastomer is preferably a rubber component-containing elastomer, examples of which include aromatic vinyl compound-containing rubbers, ethylene-propylene random copolymer rubbers, ethylene-α-olefin random copolymer rubbers, and elastomers comprising their mixtures.

Examples of the aromatic vinyl compound-containing rubbers include block copolymers made up of aromatic vinyl compound polymer blocks and conjugated diene polymer blocks, examples of which include block copolymers such as styrene-ethylene-butene-styrene rubber (SEBS), styrene-ethylene-propylene-styrene rubber (SEPS), styrene-butadiene rubber (SBR), styrene-butadiene-styrene rubber (SBS) and styrene-isoprene-styrene rubber (SIS), or block copolymers resulting from hydrogenation of these rubber components. In addition, rubbers obtained by reacting aromatic vinyl compounds such as styrene with ethylene-propylene-non-conjugated diene rubber (EPDM) are also available. Moreover, two or more kinds of aromatic vinyl compound-containing rubbers may be employed in combination.

A method for producing the aromatic vinyl compound-containing rubbers may, for example, be a method comprising bonding an aromatic vinyl compound to an olefin-based copolymer rubber or a conjugated diene rubber by means of polymerization, reaction or the like.

The ethylene-propylene random copolymer rubbers used as the elastomer denote random copolymer rubbers made up of ethylene and propylene. The propylene content thereof is preferably from 20 to 50% by weight, more preferably from 20 to 30% by weight.

The ethylene-α-olefin random copolymer rubber used as the elastomer may be any random copolymer rubber made up of ethylene and α-olefin. The α-olefin is an α-olefin having from 4 to 12 carbon atoms, examples of which include butene-1, pentene-1, hexene-1, heptene-1, octene-1 and decene. Preferred are, butene-1, hexene-1 and octene-1.

Examples of the ethylene-α-olefin random copolymer rubber include ethylene-butene-1 random copolymer rubber, ethylene-hexene-1 random copolymer rubber and ethylene-octene-1 random copolymer rubber. Preferred is ethylene-octene-1 random copolymer rubber or ethylene-butene-1 random copolymer rubber. Two or more kinds of ethylene-α-olefin copolymer rubbers may be used in combination.

The content of butene-1 contained in the above-mentioned ethylene-butene-1 random copolymer rubber is preferably from 15 to 35% by weight. The content of octene-1 contained in the ethylene-octene-1 random copolymer rubber is preferably from 15 to 45% by weight.

As to a method for producing the above-mentioned ethylene-propylene random copolymer rubber and ethylene-α-olefin random copolymer rubber, they may be produced by copolymerizing ethylene and propylene or ethylene and a certain α-olefin by a known polymerization method using a known catalyst. Examples of the known catalyst include catalyst systems comprising a vanadium compound and an organoaluminum compound, Ziegler-Natta catalyst systems or metallocene catalyst systems. Examples of the known polymerization method include solution polymerization, slurry polymerization, high pressure ion polymerization, gas phase polymerization, or the like.

Examples of the inorganic filler, which is usually used for improving stiffness, include calcium carbonate, barium sulfate, mica, crystalline calcium silicate, talc, and magnesium sulfate fiber. Preferred is talc or magnesium sulfate fiber. Two or more kinds of inorganic fillers may be used in combination.

Talc used as the inorganic filler is preferably one obtained by grinding hydrous magnesium silicate. The crystal structure of molecules of hydrous magnesium silicate is a pyrophyllite type three-layer structure. Talc comprises a laminate of this structure. A particularly preferable talc is a tabular powder resulting from fine pulverization of crystals of hydrous magnesium silicate almost to unit layers.

The talc preferably has an average particle size of 3 μm or less. The average particle size of talc denotes a 50% equivalent particle size $D_{50}$ determined from an integrated distribution curve by a minus sieve method made by suspending talc in a dispersion medium such as water and alcohol using a centrifugal sedimentation type particle size distribution measuring apparatus.

The talc may be used as received without any treatment. Alternatively, talc which has been surface-treated with known various silane coupling agents, titanium coupling agents, higher fatty acids, higher fatty esters, higher fatty amides, salts of higher fatty acids or other surfactants for the purpose of improving interfacial adhesion with the polypropylene resin (A) and improving dispersability.

The magnesium sulfate fiber used as inorganic filler preferably has an average fiber length of from 5 to 50 μm, more preferably from 10 to 30 μm. It preferably has an average fiber diameter of from 0.3 to 2.0 μm, more preferably from 0.5 to 1 μm.

The propylene-ethylene block copolymer of the present invention can be formed into a formed article using known forming methods. In particular, it is suitably used as injection molded articles for automobiles such as door trims, pillars, instrumental panels, bumpers and the like.

The present invention will be explained with reference to Examples, which are mere examples and to which the invention is not restricted.

Methods for measuring physical properties of the resins and compositions used in Examples and Comparative Examples are shown below.

(1) Intrinsic Viscosity (Unit: dl/g)

Reduced viscosities were measured at three concentrations of 0.1, 2 and 0.5 g/dl using an Ubbellohde's type viscometer. Intrinsic viscosity was calculated by a calculation method described on page 491 in "Kobunshi Yoeki (Polymer Solution), Kobunshi Jikkengaku (Polymer Experiment Study). 11" (published by Kyoritsu Shuppan K. K., 1982), namely, by an extrapolation method in which reduced viscosities are plotted against concentrations and the concentration is extrapolated in zero.

The reduced viscosity was measured at a temperature of 135° C. using tetralin as a solvent.

(1-1) Intrinsic Viscosity of Propylene-ethylene Block Copolymer (1-1a) Intrinsic Viscosity of Crystalline Polypropylene Portion: $[\eta]_P$ The intrinsic viscosity of a crystalline polypropylene portion which is a propylene homopolymer or a copolymer of propylene and up to 1 mol % of ethylene or α-olefin having 4 or more carbon atoms, $[\eta]_P$, was measured as follows. During the production, a polymer powder was sampled from a polymerization reactor after the first step, namely, the polymerization of the crystalline polypropylene portion. Then the intrinsic viscosity was measured by the method of (1) above.

(1-1b) Intrinsic Viscosity of Propylene-ethylene Random Copolymer Portion: $[\eta]_{EP}$ The intrinsic viscosity $[\eta]_{EP}$ of a propylene-ethylene random copolymer portion (EP portion) was determined by measuring the intrinsic viscosity, $[\eta]_P$, of a crystalline polypropylene portion and the intrinsic viscosity, $[\eta]_T$, of the whole ethylene-propylene block copolymer, respectively, by the method of (1) above and effecting calculation according to the following equation using a weight ratio, X, of the EP portion to the whole ethylene-propylene block copolymer. (The weight ratio X was determined by a measuring method described in (2) below.

$$[\eta]_{EP}=[\eta]_T/X-(1/X-1)\,[\eta]_P$$

$[\eta]_P$: Intrinsic viscosity (dl/g) of crystalline polypropylene portion $[\eta]_T$: Intrinsic viscosity (dl/g) of the whole propylene-ethylene block copolymer When the EP portion is obtained by two-stage polymerization after the polymerization of the crystalline polypropylene portion, the intrinsic viscosity, $[\eta]_{EP\text{-}1}$, of a propylene-ethylene random copolymer component (EP-1) produced in the former stage, the intrinsic viscosity, $[\eta]_{EP\text{-}2}$, of a propylene-ethylene random copolymer component (EP-2) produced in the latter stage, and the intrinsic viscosity, $[\eta]_{EP}$, of the propylene-ethylene random copolymer portion (EP portion) in the finally-obtained propylene ethylene block copolymer containing the crystalline polypropylene portion and the EP portion composed of components EP-1 and EP-2 were, respectively, determined by the following methods.

1) $[\eta]_{EP\text{-}1}$

The intrinsic viscosity, $[\eta]_{(1)}$, of a sample picked out from the polymerization reactor after polymerizing the propylene-ethylene random copolymer component (EP-1) produced in the former stage was measured. Then the intrinsic viscosity, $[\eta]_{EP\text{-}1}$, of the copolymer component EP-1 was determined in the same manner as (1-1b) above.

$$[\eta]_{EP\text{-}1}=[\eta]_{(1)}/X_{(1)}-(1/X_{(1)}-1)\,[\eta]_P$$

$[\eta]_P$=Intrinsic viscosity (dl/g) of the crystalline polypropylene portion $[\eta]_{(1)}$=Intrinsic viscosity (dl/g) of the whole propylene-ethylene block copolymer after polymerization of EP-1

$X_{(1)}$=Weight ratio of EP-1 to the whole propylene-ethylene block copolymer after the polymerization of EP-1

2) $[\eta]_{EP}$

The intrinsic viscosity $[\eta]_{EP}$ of an EP portion in a finally-obtained propylene-ethylene block copolymer containing a crystalline polypropylene portion and the EP portion composed of components EP-1 and EP-2 was determined in the same manner as (1-1b) above.

$$[\eta]_{EP}=[\eta]_T/X-(1/X-1)\,[\eta]_P$$

$[\eta]_P$: Intrinsic viscosity (dl/g) of crystalline polyproylene portion $[\eta]_T$: Intrinsic viscosity (dl/g) of the whole propylene-ethylene block copolymer finally obtained X: Weight ratio of finally-obtained EP portion to the whole finally-obtained propylene-ethylene block copolymer 3) $[\eta]_{EP\text{-}2}$ The intrinsic viscosity, $[\eta]_{EP\text{-}2}$, of a propylene-ethylene random copolymer component (EP-2) produced in the latter stage was determined from the intrinsic viscosity $[\eta]_{EP}$ of an EP portion in a finally-obtained propylene-ethylene block copolymer, the intrinsic viscosity $[\eta]_{EP\text{-}1}$ of the propylene-ethylene random copolymer component (EP-1) produced in the former stage, and the weight ratios of these portions.

$$[\eta]_{EP\text{-}2}=([\eta]_{EP}\cdot X-[\eta]_{EP\text{-}1}\cdot X_1)/X_2$$

$X_1$: Weight ratio of EP-1 to the whole finally-obtained propylene-ethylene block copolymer $$X_1=(X_{(1)}-X\cdot X_{(1)})/(1-X_{(1)})$$

$X_2$=Weight ratio of EP-2 to the whole finally-obtained propylene-ethylene block copolymer $$X_2=X-X_1$$

(2) Weight Ratio X of Propylene-ethylene Random Copolymer Portion (EP Portion) to the Whole Propylene-ethylene Block Copolymer, and Ethylene Content [(C2') EP] Of the EP Portion in Propylene-ethylene Block Copolymer The weight ratio X and the ethylene content $[(C2')_{EP}]$ were determined from $^{13}$C-NMR spectrum measured under the following conditions based on the report by Kakugo et al., (Macromolecules 1982, 15, 1150–1152).

A sample was prepared by homogeneously dissolving about 200 mg of a propylene-ethylene block copolymer in 3 ml of orthodichlorobenzene in a 10-mmϕ test tube. Then, the $^{13}$C-NMR spectrum of the sample was determined under the following conditions.

Measuring temperature: 135° C.
Pulse repeating time: 10 seconds
Pulse width: 45°
Number of integrations: 2500

(3) Melt Flow Rate (MFR) (unit: g/10 min)

Melt flow rate was measured according to a method provided in JIS K 6758. Measurement was conducted at a measuring temperature of 230° C. and a load of 2.16 kg unless otherwise stated.

(4) Stiffness (unit: kgf/cm$^2$)

Stiffness was measured according to a method provided in JIS K 7106. A specimen (thickness: 1 mm) formed by hot press molding at 230° C. was used. The measuring temperature was 23° C.

(5) Izod Impact Strength-1 (unit: kgf·cm/cm$^2$)

Izod impact strength was measured according to a method provided in JIS K 7110. Impact strength was evaluated by using a specimen (thickness: 5 mm) which was formed by hot press molding at 230° C. and then notching. The measurement was carried out at −30° C.

(6) Rockwell Hardness-1 (R scale)

Rockwell hardness was measured according to a method provided in JIS K 7202. Rockwell hardness was measured using a specimen (thickness: 5 mm) formed by hot press molding at 230° C. and a steel ball R and was expressed in R scale.

(7) Tensile Test-1 (UE, unit: %)

Ultimate elongation (UE, which may alternatively be called "elongation at break") was measured according to a method provided in JIS K 7113 at a tensile speed of 100 mm/min using a specimen (thickness: 1 mm) formed by hot press molding at 230° C.

(8) Flexural Modulus (FM, unit: MPa)

Flexural modulus was measured according to a method provided in JIS K 7203. The measurement was carried out at a load speed of 2.5 mm/min at 23° C. using a specimen (thickness: 6.4 mm, span length: 100 mm) formed by injection molding.

(9) Izod Impact Strength-2 (Izod, unit: kJ/m$^2$)

Izod impact strength was measured according to a method provided in JIS K 7110. Izod impact strength was measured at 23° C. or −30° C. using a specimen (thickness: 6.4 mm) obtained by injection molding and then notching.

(10) Heat Distortion Temperature (HDT, unit: ° C.)

Heat distortion temperature was measured according to a method provided in JIS K 7207 at a fiber stress of 4.6 kg/cm$^2$.

(11) Rockwell Hardness-2 (R scale)

Rockwell hardness was measured according to a method provided in JIS K 7202 by using a specimen (thickness: 3 mm) formed by injection molding. The values measured are expressed in R scale.

(12) Tensile Test-2 (UE, unit: %)

This test was conducted according to a method provided in ASTM D638. The measurement was carried out using a specimen (thickness: 3.2 mm) formed by injection molding. The ultimate elongation (UE) was evaluated at a tensile speed of 50 mm/min.

(13) Volume-average Equivalent Circular Diameter (Dv; unit: $\mu M^2$) of Dispersed Particles Which are Formed when a Propylene-ethylene Block Copolymer is Molded and Which Correspond to a Propylene-ethylene Random Copolymer Portion A Rockwell hardness test piece (thickness: 5 mm) formed by hot press molding (heating at 230° C. for 5 minutes and cooling at 30° C. for 5 minutes) was cut with a microtome at −80° C. to form a section. The section was stained with a steam of ruthenic acid at 60° C. for 90 minutes. Then an ultrathin section with a thickness of about 800 angstroms was obtained by cutting the stained portion at −50° C. by use of a diamond cutter.

The ultrathin section was observed by a transmission electron microscope (transmission electron microscope Model H-8000, mfd. by Hitachi, Ltd.) at a magnification of ×6,000. Portions stained in black correspond to a propylene-ethylene random copolymer portion (EP portion). Photographs taken in three different visual fields were subjected to an image analysis described below using highly-accurate image analyzing software "IP-1000" supplied by Asahi Engineering Co., Ltd. Thus, a volume-average equivalent circular diameter (Dv) of dispersed particles corresponding to the EP portion was determined.

(Image Analysis)

The photographs taken by the transmission electron microscope were captured (100 dpi, 8 bit) to a computer by means of a scanner GT-9600 mfd. by EPSON and were binarized by a highly-accurate image analyzing software "IP-1000" supplied by Asahi Engineering Co., Ltd. The analyzed area was 116 $\mu m^2$. Because the dispersed particles corresponding to the EP portion were indeterminate in shape, a diameter (equivalent circular particle diameter: Di, unit: $\mu m$) of a circle with an area equal to that of the EP portion was measured for each particle and a volume-average equivalent circular particle diameter (Dv) was determined using the following equation:

$$Dv = \sum_{i=1}^{n} Di^4 \Big/ \sum_{i=1}^{n} Di^3$$

where i is an integer of from 1 to n and Di denotes an equivalent circular particle diameter of each individual particle.

The measurements of Izod impact strength and Rockwell hardness, and tensile test in Examples-1 to 5 and Comparative Examples-1 to 7 were, respectively, conducted according to (5) Izod impact strength-1, (6) Rockwell hardness-1, and (7) Tensile test-1 described above.

On the other hand, the measurements of Izod impact strength and Rockwell hardness, and tensile test in Examples-6 and 7 were, respectively, conducted according to (9) Izod impact strength-2, (11) Rockwell hardness-2, and (12) Tensile test-2 described above.

(Production of Injection Molded Article)

The specimens, which were injection molded articles, for the physical property evaluations (8)–(12) used in Examples-6 and 7 were prepared by the following method.

Specimens, which were injection molded articles, were obtained by injection molding at a molding temperature of 220° C., mold cooling temperature of 50° C., injection time of 15 sec, and a cooling time of 30 sec using an injection molding machine, NEOMA, Model 350/120, mfd. by Sumitomo Heavy Industries, Ltd.

The methods for preparing two kinds of catalysts (solid catalyst components (I) and (II)) used in the preparation of the polymers used in Examples and Comparative Examples are described below.

(1) Solid Catalyst Component (I)

(1-1) Preparation of Reduced Solid Product

After purging of a 500 ml flask equipped with a stirrer and a dropping funnel with nitrogen, 290 ml of hexane, 8.9 ml (8.9 g, 26.1 mmol) of tetrabutoxytitanium, 3.1 ml (3.3 g, 11.8 mmol) of diisobutyl phthalate, and 87.4 ml (81.6 g, 392 mmol) of tetraethoxysilane were charged therein to form a homogeneous solution. Simultaneously, 199 ml of a solution of n-butylmagnesium chloride in di-n-butyl ether (mfd. by Yuki Gosei Kogyo Co., Ltd.) was dropped slowly from the dropping funnel over 5 hours while holding the temperature in the flask at 6° C. After the completion of the dropping, stirring was continued at 6° C. for 1 hour, followed by another 1-hour stirring at room temperature. Subsequently, solid-liquid separation was conducted and the resulting solid was washed repeatedly three times with 260 ml of toluene. Then, an appropriate amount of toluene was added, so that the slurry concentration became 0.176 g/ml. A part of the slurry of the solid product was sampled and subjected to composition analysis, which revealed that the solid product contained 1.96% by weight of titanium atoms, 0.12% by weight of phthalic acid ester, 37.2% by weight of ethoxy groups, and 2.8% by weight of butoxy groups.

(1-2) Preparation of Solid Catalyst Component

After purging a 100 ml flask equipped with a stirrer, a dropping funnel and a thermometer with nitrogen, 52 ml of the slurry obtained in (1) above, which contained the solid product, was introduced. Following a removal of 25.5 ml of a supernatant, a mixture of 0.80 ml (6.45 mmol) of butyl ether and 16.0 ml (0.146 mol) of titanium tetrachloride was added and then 1.6 ml (11.1 mmol; 0.20 ml per gram of the solid product). The mixture was heated to 115° C., followed by stirring for 3 hours. After completion of the reaction, solid-liquid separation was conducted at that temperature. The resultant solid was washed twice with 40 ml of toluene. Subsequently, a mixture of 10.0 ml of toluene, 0.45 ml (1.68 mmol) of diisobutyl phthalate, 0.80 ml (6.45 mmol) of butyl ether and 8.0 ml (0.073 mol) of titanium chloride was added and a treatment was conducted at 115° C. for 1 hour. After completion of the reaction, solid-liquid separation was conducted at that temperature. The resultant solid was washed with 40 ml of toluene three times and subsequently with 40 ml of hexane three times. The solid was dried under reduced pressure to afford 7.36 g of a solid catalyst component, in which 2.18% by weight of titanium atoms, 11.37% by weight of phthalic acid ester, 0.3% by weight of ethoxy groups and 0.1% by weight of butoxy groups were contained. An observation of the solid catalyst component through a stereomicroscope confirmed that the component had a superior particle form free of fine powders. This solid catalyst component is hereafter called "solid catalyst component (I)".

(2) Solid Catalyst Component (II)

After purging a 200-L SUS reactor equipped with a stirrer, 80 L of hexane, 6.55 mol of tetrabutoxytitanium and 98.9 mol of tetraethoxysilane were introduced to form a homogeneous solution. Subsequently, 50 L of diisobutyl ether solution of butylmagnesium chloride with a concentration of 2.1 mol/L was dropped slowly over 4 hours while the temperature inside the reactor was kept at 20° C. After completion of the dropping, the mixture was further stirred for 1 hour and then was subjected to solid-liquid separation at room temperature. The resultant solid was washed with 70 L of toluene repeatedly three times. After toluene was removed so that the slurry concentration became 0.5 kg/l, a mixed solution of 8.9 mol of di-n-butyl ether and 274 mol of titanium tetrachloride, and subsequently 20.8 mol of phthaloyl chloride were added, followed by a reaction at 110° C. for 3 hours. After completion of the reaction, the resulting mixture was washed with toluene three times at 95° C. Subsequently, after adjustment of the slurry concentration to 0.4 kg/L, 3.13 mol of diisobutyl phthalate, 8.9 mol of di-n-butyl ether and 109 mol of titanium tetrachloride were added, followed by a reaction at 105° C. for 1 hour. After completion of the reaction, solid-liquid separation was conducted at that temperature and the resultant solid was washed with 90 L of toluene twice at 95° C. Subsequently, after adjustment of the slurry concentration to 0.4 kg/L, 8.9 mol of di-n-butyl ether and 109 mol of titanium tetrachloride were added, followed by a reaction at 105° C. for 1 hour. After completion of the reaction, solid-liquid separation was conducted at that temperature and the resultant solid was washed with 90 L of toluene twice at that temperature. After adjustment of the slurry concentration to 0.4 kg/L, 8.9 mol of di-n-butyl ether and 109 mol of titanium tetrachloride were added, followed by a reaction at 95° C. for 1 hour. After completion of the reaction, solid-liquid separation was conducted at that temperature and the resultant solid was washed with 90 L of toluene three times at that temperature and subsequently with 40 ml of hexane three times. The solid was dried under reduced pressure to afford 12.8 kg of a solid catalyst component. It contained 2.1% by weight of titanium atoms, 18% by weight of magnesium atoms, 60% by weight of chlorine atoms, 7.15% by weight of phthalic acid ester, 0.05% by weight of ethoxy groups and 0.26% by weight of butoxy groups and was in favorable particle conditions free of fine powders. This solid catalyst component is hereafter called "solid catalyst component (II)".

Production of Propylene-ethylene Block Copolymer (BCPP-1) (Former Stage)

To heptane contained in a glass charger, 9.3 mg of solid catalyst component (I), 4.4 mmol of triethylaluminum and 0.44 mmol of di-tert-butyl dimethoxy silane were added to form a mixture. The mixture was charged into a 3-L stainless autoclave equipped with a stirrer which was dried under reduced pressure, purged with argon and cooled previously. Subsequently, 5000 mmHg of hydrogen and 780 g of propylene were fed to the autoclave and the temperature was raised to 80° C. to start polymerization. After 10 minutes from the start of the polymerization, the unreacted propylene was purged outside the polymerization system and at the same time the temperature inside the autoclave was lowered to 70° C. A polymer sampled in a small amount had an intrinsic viscosity $[\eta]_P$ of 1.35 dl/g.

(Latter Stage)

Subsequently, a mixed gas was continuously fed at rates of 0.8 NL/min for ethylene, 6.0 NL/min for propylene and 0.03 NL/min for hydrogen so that the total pressure became 6.0 Kg/m²G, thereby performing polymerization for 90 minutes. After 90 minutes, the gas in the autoclave was purged to terminate the polymerization. A resulting polymer was dried under reduced pressure at 60° C. for 5 hours, yielding 218 g of polymerized powder.

The finally-obtained polymer had an intrinsic viscosity $[\eta]_T$ of 1.69 dl/g. The content (EP-cont.) of a propylene-ethylene random copolymer portion (EP portion) in the polymer was 43% by weight. Therefore, the intrinsic viscosity $[\eta]_{EP}$ of the polymer produced in the latter stage (namely, the EP portion) was 2.2 dl/g. The ethylene content $[(C2')_{EP}]$ in the EP portion was 25% by weight. The results of analysis of the polymer are shown in Table 1.

Productions of BCPP-2 and BCPP-3

Productions of BCPP-2 and BCPP-3 were carried out in the same manner as that of BCPP-1 except adjusting the feeding amounts of hydrogen, propylene and ethylene in polymerization of an EP portion so that polymers shown in Table 1 were obtained. The results of analysis of the polymers obtained are shown in Table 1.

Production of BCPP-4
(Former Stage)

To heptane contained in a glass charger, 9.2 mg of solid catalyst component (I), 4.4 mmol of triethylaluminum and 0.44 mmol of di-tert-butyl dimethoxy silane were added to form a mixture. The mixture was charged into a 3-L stainless autoclave equipped with a stirrer which was dried under reduced pressure, purged with argon and cooled previously. Subsequently, 5000 mmHg of hydrogen and 780 g of propylene were fed to the autoclave and the temperature was raised to 80° C. to start polymerization. After 10 minutes from the start of the polymerization, the unreacted propylene was purged outside the polymerization system and at the same time the temperature inside the autoclave was lowered to 70° C. A polymer sampled in a small amount had an intrinsic viscosity $[\eta]_P$ of 1.46 dl/g.

(Latter Stage)

Subsequently, a mixed gas was continuously fed at rates of 4.0 NL/min for ethylene, 6.0 NL/min for propylene and 0.04 NL/min for hydrogen so that the total pressure became 6.0 Kg/m²G, thereby performing polymerization for 16 minutes. After 16 minutes, the gas in the autoclave was purged and a sample for analysis in a small amount was picked out. Then, a mixed gas was continuously fed at rates of 0.8 NL/min for ethylene, 6.0 NL/min for propylene and 0.03 NL/min for hydrogen so that the total pressure became 6.0 Kg/m²G, thereby performing polymerization for 60 minutes. After 60 minutes, the monomers in the autoclave were purged to terminate the polymerization. The polymer formed was dried under reduced pressure at 60° C. for 5 hours, affording 272 g of a polymerized powder.

The finally-obtained polymer had an intrinsic viscosity $[\eta]_T$ of 1.74 dl/g and the content (EP-cont.) of the polymer produced in the latter stage (namely, EP portion) was 39% by weight. Therefore, the EP portion had an intrinsic viscosity $[\eta]_{EP}$ of 2.2 dl/g and the ethylene content $[(C2')_{EP}]$ in the EP portion was 39% by weight. From the results of analysis of the sample (i) taken during the course of polymerization, the propylene-ethylene random copolymer component (EP-1) produced in the first polymerization in the latter stage had an ethylene content $[(C2')_{EP-1}]$ of 60% by weight and an intrinsic viscosity $[\eta]_{EP-1}$ of 2.4 dl/g. The propylene-ethylene random copolymer component (EP-2) produced in the second polymerization in the latter stage had an ethylene content $[(C2')_{EP-2}]$ of 27% by weight and an intrinsic viscosity $[\eta]_{EP-2}$ of 2.1 dl/g. The results of the analysis are shown in Table 1.

Production of BCPP-5
(Former Stage)

To heptane contained in a glass charger, 9.2 mg of solid catalyst component (I), 4.4 mmol of triethylaluminum and 0.44 mmol of di-tert-butyl dimethoxy silane were added to form a mixture. The mixture was charged into a 3-L stainless autoclave equipped with a stirrer which was dried under reduced pressure, purged with argon and cooled previously. Subsequently, 5500 mmHg of hydrogen and 780 g of propylene were fed to the autoclave and the temperature was raised to 80° C. to start polymerization. After 10 minutes from the start of the polymerization, the unreacted propylene was purged outside the polymerization system and at the same time the temperature inside the autoclave was lowered to 70° C. A polymer sampled in a small amount had an intrinsic viscosity $[\eta]_P$ of 1.37 dl/g.

(Latter Stage)

Subsequently, a mixed gas was continuously fed at rates of 4.0 NL/min for ethylene, 6.0 NL/min for propylene and 0.04 NL/min for hydrogen so that the total pressure became 6.0 Kg/m²G, thereby performing polymerization for 15 minutes. After 15 minutes, the gas in the autoclave was purged and a sample for analysis in a small amount was picked out. Then, a mixed gas was continuously fed at rates of 0.8 NL/min for ethylene and 6.0 NL/min for propylene so that the total pressure became 6.0 Kg/m²G, thereby performing polymerization for 25 minutes. After 25 minutes, the monomers in the autoclave were purged to terminate the polymerization. The polymer formed was dried under reduced pressure at 60° C. for 5 hours, affording 230 g of a polymerized powder.

The finally-obtained polymer had an intrinsic viscosity $[\eta]_T$ of 1.64 dl/g and the content (EP-cont.) of the polymer produced in the latter stage (namely, EP portion) was 23% by weight. Therefore, the EP portion had an intrinsic viscosity $[\eta]_{EP}$ of 2.6 dl/g and the ethylene content $[(C2')_{EP}]$ in the EP portion was 54% by weight. From the results of analysis of the sample (i) taken during the course of polymerization, the propylene-ethylene random copolymer component (EP-1) produced in the first polymerization in the latter stage had an ethylene content $[(C2')_{EP-1}]$ of 60% by weight and an intrinsic viscosity $[\eta]_{EP-1}$ of 2.4 dl/g. The propylene-ethylene random copolymer component (EP-2) produced in the second polymerization in the latter stage had an ethylene content $[(C2')_{EP-2}]$ of 40% by weight and an intrinsic viscosity $[\eta]_{EP-2}$ of 3.0 dl/g. The results of the analysis are shown in Table 1.

Production of BCPP-6

(Former Stage)

To heptane contained in a glass charger, 9.2 mg of solid catalyst component (I), 4.4 mmol of triethylaluminum and 0.44 mmol of di-tert-butyl dimethoxy silane were added to form a mixture. The mixture was charged into a 3-L stainless autoclave equipped with a stirrer which was dried under reduced pressure, purged with argon and cooled previously. Subsequently, 7600 mmHg of hydrogen and 780 g of propylene were fed to the autoclave and the temperature was raised to 80° C. to start polymerization. After 10 minutes from the start of the polymerization, the unreacted propylene was purged outside the polymerization system and at the same time the temperature inside the autoclave was lowered to 70° C. A polymer sampled in a small amount had an intrinsic viscosity $[\eta]_P$ of 1.21 dl/g.

(Latter Stage)

Subsequently, a mixed gas was continuously fed at rates of 4.0 NL/min for ethylene, 6.0 NL/min for propylene and 2.0 NL/min for hydrogen so that the total pressure became 6.0 Kg/m²G, thereby performing polymerization for 20 minutes. After 20 minutes, the gas in the autoclave was purged and a sample for analysis in a small amount was picked out. Then, a mixed gas was continuously fed at rates of 0.8 NL/min for ethylene and 6.0 NL/min for propylene so that the total pressure became 6.0 Kg/m²G, thereby performing polymerization for 90 minutes. After 90 minutes, the monomers in the autoclave were purged to terminate the polymerization. The polymer formed was dried under reduced pressure at 60° C. for 5 hours, affording 244.7 g of a polymerized powder.

The finally-obtained polymer had an intrinsic viscosity $[\eta]_T$ of 1.56 dl/g and the content (EP-cont.) of the polymer produced in the latter stage (namely, EP portion) was 25% by weight. Therefore, the EP portion had an intrinsic viscosity $[\eta]_{EP}$ of 2.7 dl/g and the ethylene content $[(C2')_{EP}]$ in the EP portion was 48% by weight. From the results of analysis of the sample (i) taken during the course of polymerization, the propylene-ethylene random copolymer component (EP-1) produced in the first polymerization in the latter stage had an ethylene content $[(C2')_{EP-1}]$ of 60% by weight and an intrinsic viscosity $[\eta]_{EP-1}$ of 1.0 dl/g. The propylene-ethylene random copolymer component (EP-2) produced in the second polymerization in the latter stage had an ethylene content $[(C2')_{EP-2}]$ of 45% by weight and an intrinsic viscosity $[\eta]_{EP-2}$ of 3.0 dl/g. The results of the analysis are shown in Table 1.

Production of BCPP-7

(Former Stage)

To heptane contained in a glass charger, 9.2 mg of solid catalyst component (I), 4.4 mmol of triethylaluminum and 0.44 mmol of di-tert-butyl dimethoxy silane were added to form a mixture. The mixture was charged into a 3-L stainless autoclave equipped with a stirrer which was dried under reduced pressure, purged with argon and cooled previously. Subsequently, 5500 mmHg of hydrogen and 780 g of propylene were fed to the autoclave and the temperature was raised to 80° C. to start polymerization. After 10 minutes from the start of the polymerization, the unreacted propylene was purged outside the polymerization system and at the same time the temperature inside the autoclave was lowered to 70° C. A polymer sampled in a small amount had an intrinsic viscosity $[\eta]_P$ of 1.39 dl/g.

(Latter Stage)

Subsequently, a mixed gas was continuously fed at rates of 4.0 NL/min for ethylene and 6.0 NL/min for propylene so that the total pressure became 6.0 Kg/m²G, thereby performing polymerization for 20 minutes. After 20 minutes, the gas in the autoclave was purged and a sample for analysis in a small amount was picked out. Then, a mixed gas was continuously fed at rates of 0.8 NL/min for ethylene, 6.0 NL/min for propylene and 0.05 NL/min for hydrogen so that the total pressure became 6.0 Kg/m²G, thereby performing polymerization for 30 minutes. After 30 minutes, the monomers in the autoclave were purged to terminate the polymerization. The polymer formed was dried under reduced pressure at 60° C. for 5 hours, affording 252 g of a polymerized powder.

The finally-obtained polymer had an intrinsic viscosity $[\eta]_T$ of 1.69 dl/g and the content (EP-cont.) of the polymer produced in the latter stage (namely, EP portion) was 35% by weight. Therefore, the EP portion had an intrinsic viscosity $[\eta]_{EP}$ of 2.3 dl/g and the ethylene content $[(C2')_{EP}]$ in the EP portion was 42% by weight. From the results of analysis of the sample (i) taken during the course of polymerization, the propylene-ethylene random copolymer component (EP-1) produced in the first polymerization in the latter stage had an ethylene content $[(C2')_{EP-1}]$ of 60% by weight and an intrinsic viscosity $[\eta]_{EP-1}$ of 3.8 dl/g. The propylene-ethylene random copolymer component (EP-2) produced in the second polymerization in the latter stage had an ethylene content $[(C2')_{EP-2}]$ of 38% by weight and an intrinsic viscosity $[\eta]_{EP-2}$ of 1.9 dl/g. The results of the analysis are shown in Table 1.

Production of BCPP-8
(Former Stage)

To heptane contained in a glass charger, 9.2 mg of solid catalyst component (I), 4.4 mmol of triethylaluminum and 0.44 mmol of di-tert-butyl dimethoxy silane were added to form a mixture. The mixture was charged into a 3-L stainless autoclave equipped with a stirrer which was dried under reduced pressure, purged with argon and cooled previously. Subsequently, 5500 mmHg of hydrogen and 780 g of propylene were fed to the autoclave and the temperature was raised to 80° C. to start polymerization. After 10 minutes from the start of the polymerization, the unreacted propylene was purged outside the polymerization system and at the same time the temperature inside the autoclave was lowered to 70° C. A polymer sampled in a small amount had an intrinsic viscosity $[\eta]_P$ of 1.39 dl/g.

(Latter Stage)

Subsequently, a mixed gas was continuously fed at rates of 4.0 NL/min for ethylene and 6.0 NL/min for propylene so that the total pressure became 6.0 Kg/m²G, thereby performing polymerization for 20 minutes. After 20 minutes, the gas in the autoclave was purged and a sample for analysis in a small amount was picked out. Then, a mixed gas was continuously fed at rates of 0.8 NL/min for ethylene, 6.0 NL/min for propylene and 0.05 NL/min for hydrogen so that the total pressure became 6.0 Kg/m²G, thereby performing polymerization for 30 minutes. After 30 minutes, the monomers in the autoclave were purged to terminate the polymerization. The polymer formed was dried under reduced pressure at 60° C. for 5 hours, affording 252 g of a polymerized powder.

The finally-obtained polymer had an intrinsic viscosity $[\eta]_T$ of 1.45 dl/g and the content (EP-cont.) of the polymer produced in the latter stage (namely, EP portion) was 30% by weight. Therefore, the EP portion had an intrinsic viscosity $[\eta]_{EP}$ of 1.9 dl/g and the ethylene content $[(C2')_{EP}]$ in the EP portion was 43% by weight. From the results of analysis of the sample (i) taken during the course of polymerization, the propylene-ethylene random copolymer component (EP-1) produced in the first polymerization in the latter stage had an ethylene content $[(C2')_{EP-1}]$ of 60% by weight and an intrinsic viscosity $[\eta]_{EP-1}$ of 3.8 dl/g. The propylene-ethylene random copolymer component (EP-2) produced in the second polymerization in the latter stage had an ethylene content $[(C2')_{EP-2}]$ of 36% by weight and an intrinsic viscosity $[\eta]_{EP-2}$ of 1.0 dl/g. The results of the analysis are shown in Table 1.

Production of BCPP-9

(1) Preliminary Polymerization

In a 3-L SUS autoclave equipped with a stirrer, 25 mmol/L of triethylaluminum (hereafter abbreviated TEA), tert-butyl-n-propyldimethoxysilane (hereafter abbreviated tBnPDMS), wherein tBnPDMS/TEA=0.1 (mol/mol), and 20 g/L of a solid catalyst component (II) were added to n-hexane which had been fully dewatered and degassed. Subsequently, preliminary polymerization was carried out by feeding propylene continuously until the amount of the propylene became 2.5 g per gram of the solid catalyst while keeping the temperature at 15° C. or lower. The resulting preliminary polymer slurry was transferred to a 200-L SUS dilution vessel with a stirrer, diluted by addition of a fully refined liquid butane, and preserved at a temperature of 10° C. or lower.

(2) Main Polymerization

Two fluidized bed gas phase reactors with a capacity of 1 m³ were arranged tandem. Main polymerization was conducted as a former stage by gas phase polymerization in which a propylene polymer portion was polymerized in the first reactor, the polymer formed was transferred to the second reactor without being deactivated and, as a latter stage, a propylene-ethylene copolymer portion was then polymerized continuously in the second reactor.

In the first reactor, continuous polymerization was carried out by feeding 2 mmol/h of TEA, 4.0 mmol/h of tBnPDMS, and 0.7 g/h of the preliminary polymer slurry prepared in (2-3a) as a solid catalyst component under conditions such that propylene and hydrogen were supplied so that the polymerization temperature, the polymerization pressure and the hydrogen concentration in a gas phase portion were kept, respectively, at 80° C., 1.8 MPa and 10 vol %. Thus, 13.2 kg/h of polymer was obtained. The polymer has an intrinsic viscosity $[\eta]_P$ of 0.95 dl/g.

The resulting polymer discharged was introduced into the second reactor without being deactivated. In the second reactor, continuous polymerization was continued by feeding 6.2 mmol of tetraethoxysilane (hereafter abbreviated TES) under conditions such that propylene, ethylene and hydrogen were supplied continuously so that the polymerization temperature, the polymerization pressure, the hydrogen concentration and ethylene concentration in a gas phase portion were kept, respectively, at 65° C., 1.4 MPa, 2.5 vol % and 24.1 vol %. Thus, 19.4 kg/h of polymer was obtained. Because the resulting polymer had an intrinsic viscosity $[\eta]_T$ of 1.6 dl/g and a content (EP-cont.) of the polymer produced in the latter stage (namely, EP portion) of 27% by weight, the intrinsic viscosity $[\eta]_{EP}$ of the polymer produced in the latter stage (EP portion) was 3.0 dl/g. As a result of analysis, the ethylene content $[(C2')_{EP}]$ in the EP portion was 41% by weight. The results of the analysis of the polymer are shown in Table 1.

Production of BCPP-10 to BCPP-12

Productions of polymers were carried out in the same manner as that used for BCPP-9 except adjusting the hydrogen concentration and ethylene concentration in a gas phase portion and the feeding amount of a solid catalyst component in a main polymerization so as to obtain the polymers shown in Table 2. The results of analysis of the polymers obtained are shown in Table 2.

Production of BCPP-13

(1) Preliminary Polymerization

A preliminary polymerization was carried out in the same manner as that used for BCPP-9.

(2) Main Polymerization

Two fluidized bed gas phase reactors with a capacity of 1 m³ were arranged tandem. Main polymerization was conducted as a former stage by semibatch type gas phase polymerization in which a propylene polymer portion was polymerized continuously in the first reactor, the polymer formed was transferred to the second reactor without being deactivated and, as a latter stage, a propylene-ethylene copolymer portion was then polymerized batchwise in the second reactor.

In the first reactor, continuous polymerization was carried out by feeding 30 mmol/h of TEA, 4.5 mmol/h of tBnPDMS and 1.2 g/h of the preliminary polymer slurry prepared in (2-3a) as a solid catalyst component under conditions such that propylene and hydrogen were supplied so that the polymerization temperature, the polymerization pressure, the hydrogen concentration in a gas phase portion were kept, respectively, at 80° C., 1.8 MPa and 10 vol %. Thus, 20.3 kg/h of polymer was obtained. The polymer has an intrinsic viscosity $[\eta]_P$ of 1.04 dl/g.

The second reactor was held at 0.3 MPa on standby. After it received the polymer transferred continuously from the first reactor, 22 mmol of tetraethoxysilane (TES) was added thereto. Subsequently, 41.7 kg of polymer was obtained by performing batch polymerization (referred to as EP-1 polymerization) under conditions such that propylene, ethylene and hydrogen were supplied continuously so that the polymerization temperature, the polymerization pressure, the hydrogen concentration and the ethylene concentration in a gas phase portion were kept at 65° C., 1.2 MPa, 2.1 vol % and 20 vol %, respectively. A part of the reaction mixture was taken out of the system contained in the second reactor and the polymer obtained was analyzed. As a result, the intrinsic viscosity $[\eta]_T$ was 1.27 dl/g and the content (EP-1 content) of the polymer component (EP-1) produced in the latter stage was 14.7% by weight. Therefore, the intrinsic viscosity $[\eta]_{EP-1}$ of the polymer component produced in the latter stage (component EP-1) was 2.6 dl/g. In addition, the ethylene content $[(C2')_{EP-1}]$ in the component EP-1 was 35% by weight. Furthermore, batch polymerization (referred to as EP-2 polymerization) was carried out in the second reactor under conditions such that propylene, ethylene and hydrogen were supplied continuously so that the polymerization temperature, the polymerization pressure, the hydrogen concentration and the ethylene concentration in a gas phase portion were kept at 65° C., 1.4 MPa, 9.1 vol % and 45.8 vol %, respectively. Finally, 50.9 kg of polymer was obtained. The polymer recovered had an intrinsic viscosity $[\eta]_T$ of 1.48 dl/g and a content of the polymer (EP portion) produced in the latter stage of 29% by weight. Therefore, the intrinsic viscosity $[\eta]_{EP}$ of the EP portion was 2.6 dl/g. In addition, the ethylene content $[(C2')_{EP}]$ in the EP portion was 52% by weight. As a result, the intrinsic viscosity $[\eta]_{EP-2}$ of the propylene-ethylene copolymer component produced in EP-2 polymerization (namely, component EP-2) and the ethylene content $[(C2')_{EP-2}]$ in the component EP-2 were calculated to be 2.6 dl/g and 65% by weight, respectively. The results of analysis of the polymers obtained are shown in Table 2.

Production of BCPP-14 and BCPP-15

Production of BCPP-14 and BCPP-15 were carried out in the same manner as that used for BCPP-13 except adjusting the hydrogen concentration and ethylene concentration in a gas phase portion and the feeding amount of a solid catalyst component in a main polymerization so as to obtain the polymers shown in Table 2. The results of analysis of the polymers obtained are shown in Table 2.

EXAMPLE-1

To 100 parts by weight of a propylene-ethylene block copolymer powder (BCPP-5), 0.05 parts by weight of calcium stearate (mfd. by NOF Corp.), 0.05 parts by weight of 3,9-bis[2-{3-(3-tert-butyl-4-hydroxy-5-methylphenyl)propion yloxy}-1,1-dimethylethyl]-2,4,8,10-tetraoxaspiro[5·5]undecane (Sumilizer GA80, mfd. by Sumitomo Chemical Co., Ltd.), and 0.05 parts by weight of bis(2,4-di-tert-butylphenyl)pentaerythritol diphosphite (Ultranox U626, mfd. by GE Specialty Chemicals) as stabilizers were added and formed into pellets by use of a φ22-mm single screw extruder. The pellets had an MFR of 13 g/10 min. The resulting pellets were hot press molded into a specimen, the physical properties of which were then measured.

In addition, a volume-average equivalent circular particle diameter (Dv) was determined from transmission electron microphotographs of an ultrathin section cut from the hot-press molded article using an image analyzing device. In Table 3, the MFR, the physical properties and the volume-average equivalent circular particle diameter (Dv) are shown.

A value obtained by substituting the content (EP-cont.) of the propylene-ethylene random copolymer portion (EP portion) in BCPP-5 and the ethylene content $[(C2')_{EP}]$ of the EP portion into the right side of formula (I) is also shown in Table 2.

EXAMPLES-2 TO 4

An MFR and physical properties were measured by performing the same processing as Example-1 except changing BCPP-5 to a propylene-ethylene block copolymer (BCPP) shown in Table 3. Further, a volume-average equivalent circular particle diameter (Dv) was also determined. It is to be noted that in a pelletization step, adjustment was performed by blending a homopolypropylene having an intrinsic viscosity $[\eta]_P$ of 1.48 in a blend ratio shown in Table 3 so as to make a content (EP-cont.) of the propylene-ethylene random copolymer portion (EP content) equal to that of Example-1. The MFR, the physical properties and the volume-average equivalent circular particle diameter (Dv) are shown in Table 3.

COMPARATIVE EXAMPLES-1 TO 4

An MFR and physical properties were measured by performing the same processing as Example-1 except changing BCPP-5 to a propylene-ethylene block copolymer (BCPP) shown in Table 4. Further, a volume-average equivalent circular particle diameter (Dv) was also determined. It is to be noted that in a pelletization step, adjustment was performed by blending a homopolypropylene having an intrinsic viscosity $[\eta]_P$ of 1.48 in a blend ratio shown in Table 4 so as to make a content (EP-cont.) of the propylene-ethylene random copolymer portion (EP content) equal to that of Example-1. The MFR, the physical properties and the volume-average equivalent circular particle diameter (Dv) are shown in Table 4.

EXAMPLE-5 AND COMPARATIVE EXAMPLES-5 TO 7

An MFR and physical properties were measured by performing the same processing as Example-1 except changing BCPP-5 to a propylene-ethylene block copolymer (BCPP) shown in Table 5. A volume-average equivalent circular particle diameter (Dv) was also determined. It is to be noted that in Example-5 and Comparative Example-5, adjustment was performed in a pelletization step by blending a homopolypropylene having an intrinsic viscosity $[\eta]_P$ of 1.48 in a blend ratio shown in Table 5 so as to make a content (EP-cont.) of the propylene-ethylene random copolymer portion (EP portion) equal to that of Example-1.

EXAMPLE-6

To 100 parts by weight of a propylene-ethylene block copolymer powder (BCPP-13), 0.05 part by weight of calcium stearate, 0.05 part by weight of 3,9-bis[2-{3-(3-tert-butyl-4-hydroxy-5-methylphenyl)propion yloxy}-1,1-dimethylethyl]-1,4,8,10-tetraoxaspiro[5.5]undecane (Sumilizer GA80, mfd. by Sumitomo Chemical Co., Ltd.) and 0.05 part by weight of bis(2,4-di-tert-butylphenyl)pentaerythritoldiphosphite (Ultranox U626, mfd. by GE Specialty Chemicals) were added and dry blended. Then the mixture was formed into pellets by use of a φ22-mm single screw extruder (at 220° C., screen pack: metal fiber sintered fillter NF13D mfd. by Nippon Fine Wiring Co., Ltd). The pellets had an MFR of 17 g/10 min. The resulting pellets were hot-press molded into a specimen, the physical properties of which were then measured. The MFR and the physical properties are shown in Table 6.

EXAMPLE-7

An MFR and physical properties of an injection molded article were measured by performing the same processing as Example-6 except changing BCPP-13 to a propylene-ethylene block copolymer (BCPP) shown in Table 6. It is to be noted that in Example-7, adjustment was performed in a pelletization step by blending 80% by weight of BCPP-13 used in Example-6 and 20% by weight of a homopolypropylene having an intrinsic viscosity $[\eta]_P$ of 0.95 so as to make a content (EP-cont.) of the propylene-ethylene random copolymer portion (EP portion) equal to 23% by weight. The MFR and the physical properties are shown in Table 6.

TABLE 1

|  |  | BCPP-1 | BCPP-2 | BCPP-3 | BCPP-4 | BCPP-5 | BCPP-6 | BCPP-7 | BCPP-8 |
|---|---|---|---|---|---|---|---|---|---|
| $[\eta]_P$ | dl/g | 1.35 | 1.30 | 1.40 | 1.46 | 1.37 | 1.20 | 1.39 | 1.27 |
| $[\eta]_{EP}$ | dl/g | 2.2 | 2.0 | 2.4 | 2.2 | 2.6 | 2.7 | 2.3 | 1.9 |
| $(C'2)_{EP}$ | wt % | 25 | 44 | 57 | 39 | 54 | 48 | 42 | 43 |
| EP-cont. | wt % | 46 | 31 | 29 | 39 | 23 | 25 | 35 | 30 |
| $[\eta]_{EP-1}$ | dl/g | — | — | — | 2.4 | 2.4 | — | 3.8 | 3.8 |
| $(C'2)_{EP-1}$ | wt % | — | — | — | 60 | 60 | 60 | 60 | 60 |
| $[\eta]_{EP-2}$ | dl/g | — | — | — | 2.1 | 3.0 | 3.0 | 1.9 | 1.0 |
| $(C'2)_{EP-2}$ | wt % | — | — | — | 27 | 40 | 45 | 38 | 36 |

TABLE 2

|  |  | BCPP-9 | BCPP-10 | BCPP-11 | BCPP-12 | BCPP-13 | BCPP-14 | BCPP-15 |
|---|---|---|---|---|---|---|---|---|
| $[\eta]_P$ | dl/g | 0.95 | 0.95 | 0.93 | 0.98 | 1.04 | 0.95 | 0.95 |
| $[\eta]_{EP}$ | dl/g | 3.0 | 2.8 | 2.5 | 2.2 | 2.6 | 3.0 | 3.1 |
| $(C'2)_{EP}$ | wt % | 41 | 62 | 30 | 40 | 52 | 53 | 52 |
| EP-cont. | wt % | 27 | 27 | 25 | 29 | 29 | 28 | 29 |
| $[\eta]_{EP-1}$ | dl/g | — | — | — | — | 2.6 | 2.8 | 2.6 |
| $(C'2)_{EP-1}$ | wt % | — | — | — | — | 35 | 36 | 31 |
| $[\eta]_{EP-2}$ | dl/g | — | — | — | — | 2.6 | 3.1 | 3.4 |
| $(C'2)_{EP-2}$ | wt % | — | — | — | — | 65 | 68 | 64 |

TABLE 3

|  |  | Example-1 | Example-2 | Example-3 | Example-4 |
|---|---|---|---|---|---|
| Blend ratio (wt %) | BCPP-5 | 100 | 0 | 0 | 0 |
|  | BCPP-4 | 0 | 61 | 0 | 0 |
|  | BCPP-6 | 0 | 0 | 90 | 0 |
|  | BCPP-7 | 0 | 0 | 0 | 66 |
|  | HomoPP*) | 0 | 39 | 10 | 34 |
| Value of right side of formula (1) |  | 1.9 | 1.4 | 1.7 | 1.5 |
| Dv (μm) |  | 1.8 | 1.3 | 1.6 | 1.5 |
| MFR (g/10 min) |  | 13 | 10 | 24 | 16 |
| Stiffness (kgf/cm³) |  | 11300 | 11800 | 11600 |  |
| Rockwell hardness (R scale) |  | 75 | 80 | 76 | 78 |
| Tensile elongation (%) at 100 mm/min |  | 386 | 262 | 440 | 188 |
| Izod impact strength at −30° C. with notch (kgf·cm/cm³) |  | 4.2 | 3.9 | 3.6 | 3.7 |

*)Homopolypropylene having $[\eta]_P$ of 1.48

TABLE 4

|  |  | Comp. Example-1 | Comp. Example-2 | Comp. Example-3 | Comp. Example-4 |
|---|---|---|---|---|---|
| Blend ratio (wt %) | BCPP-1 | 54 | 0 | 0 | 0 |
|  | BCPP-2 | 0 | 75 | 0 | 0 |
|  | BCPP-3 | 0 | 0 | 80 | 0 |
|  | BCPP-8 | 0 | 0 | 0 | 77 |
|  | HomoPP*) | 46 | 25 | 20 | 23 |
| Value of right side of formula (1) |  | 1.0 | 1.6 | 2.0 | 1.6 |
| Dv (μm) |  | 1.3 | 2.0 | 2.8 | 1.9 |
| MFR (g/10 min) |  | 13 | 25 | 13 | 38 |
| Rockwell hardness (R scale) |  | 82 | 78 | 78 | 78 |
| Tensile elongation (%) at 100 mm/min |  | 302 | 61 | 71 | 68 |
| Izod impact strength at −30° C. with notch (kgf·cm/cm³) |  | 2.1 | 3.9 | 4.2 | 2.6 |

*)Homopolypropylene having $[\eta]_P$ of 1.48

TABLE 5

|  |  | Example-5 | Comp. Example-5 | Comp. Example-6 | Comp. Example-7 |
|---|---|---|---|---|---|
| Blend ratio (wt %) | BCPP-4 | 76 | 0 | 0 | 0 |
|  | BCPP-2 | 0 | 87 | 0 | 0 |
|  | BCPP-3 | 0 | 0 | 100 | 0 |
|  | BCPP-8 | 0 | 0 | 0 | 100 |
|  | HomoPP*) | 24 | 13 | 0 | 0 |
| Value of right side of formula (1) |  | 2.0 | 1.9 | 2.5 | 2.1 |
| Dv (μm) |  | 1.7 | 2.7 | 4.9 | 2.3 |
| MFR (g/10 min) |  | 9 | 22 | 12 | 27 |
| Stiffness (kgf/cm³) |  | 10300 | 11000 | 11200 | 9400 |
| Rockwell hardness (R scale) |  | 69 | 72 | 69 | 66 |
| Tensile elongation (%) at 100 mm/min |  | 473 | 139 | 149 | 330 |
| Izod impact strength at −30° C. with notch (kgf·cm/cm³) |  | 5.2 | 4.3 | 5.7 | 4.1 |

*)Homopolypropylene having $[\eta]_P$ of 1.48

TABLE 6

|  |  | Example-6 | Example-7 |
|---|---|---|---|
| Blend ratio (wt %) | BCPP-13 | 100 | 80 |
|  | HomoPP**) | 0 | 20 |

TABLE 6-continued

|  | Example-6 | Example-7 |
| --- | --- | --- |
| MFR (g/10 min) | 17 | 25 |
| FM (MPa) | 763 | 891 |
| HDT (° C.) | 95 | 102 |
| Rockwell hardness (R scale) | 61 | 77 |
| Tensile elongation (%) at 50 mm/min | 474 | 504 |
| Izod impact strength at 23° C. with notch (kJ/m$^2$) | 59 | 12.2 |
| Izod impact strength at −30° C. with notch (kJ/m$^2$) | 7.2 | 5.0 |

**)Homopolypropylene having $[\eta]_P$ of 0.95

It is clear that in Examples-1 to 7 which meet the requirements of the present invention, there were provided propylene-ethylene block copolymers which are superior in stiffness, hardness and moldability and also is superior in the balance between toughness and low-temperature impact resistance when being molded.

It is clear that Comparative Examples-1 to 7 are insufficient in the balance among stiffness, hardness and tensile elongation or low-temperature impact resistance because a propylene-ethylene random copolymer portion is not composed of two kinds of propylene-ethylene random copolymers which meet the requirements of the present invention and a volume-average equivalent circular particle diameter obtained when a propylene-ethylene block copolymer is molded is larger than a value of the right side of formula (I).

In Comparative Example-4, the intrinsic viscosities ($[\eta]_{EP-A}$ and $[\eta]_{EP-B}$) of the two kinds of propylene-ethylene random copolymer components constituting a propylene-ethylene random copolymer portion do not meet the requirements of the present invention.

As described in detail above, according to the present invention, it is possible to obtain a propylene-ethylene block copolymer which is superior in stiffness, hardness and moldability and also is superior in balance between toughness and low-temperature impact resistance when being molded, and a molded article made of the same.

What is claimed is:

1. A propylene-ethylene block copolymer comprising:
   from 60 to 85% by weight of a crystalline polypropylene portion which is a propylene homopolymer or a copolymer of propylene and up to 1 mol % of ethylene or α-olefin having 4 or more carbon atoms, and
   from 15 to 40% by weight of a propylene-ethylene random copolymer portion with a propylene to ethylene weight ratio (propylene/ethylene) of from 75/25 to 35/65,
   wherein the propylene-ethylene block copolymer satisfies requirements (1-1) and (1-2) below:
   Requirement (1-1): The propylene-ethylene random copolymer portion comprises two kinds of propylene-ethylene random copolymer components (EP-A) and (EP-B), wherein the copolymer component (EP-A) has an intrinsic viscosity $[\eta]_{EP-A}$ of not less than 1.5 dl/g but less than 4 dl/g and an ethylene content $[(C2')_{EP-A}]$ of not less than 20% by weight but less than 50% by weight, and wherein the copolymer component (EP-B) has an intrinsic viscosity $[\eta]_{EP-B}$ of not less than 0.5 dl/g but less than 3 dl/g and an ethylene content $[(C2')_{EP-B}]$ of not less than 50% by weight and not more than 80% by weight,
   Requirement (1-2): The content (EP-cont.) of the propylene-ethylene random copolymer portion, the ethylene content $[(C2')_{EP}]$ in the propylene-ethylene random copolymer portion and the volume-average equivalent circular diameter (Dv) of dispersed particles which are formed when the propylene-ethylene block copolymer is molded and which correspond to the propylene-ethylene random copolymer portion satisfy the following formula (I):

$$Dv \leq -1.7 + 0.032 \times [(C2')_{EP}] + 0.082 \times (EP\text{-cont.}) \quad \text{(I):}$$

and also satisfies requirement (2) below:
   Requirement (2): The propylene-ethylene block copolymer has a melt flow rate (MFR) of from 5 to 120 g/10 min.

2. The propylene-ethylene block copolymer according to claim 1, wherein the ethylene content $[(C2')_{EP-A}]$ of the propylene-ethylene random copolymer component (EP-A) is from 25 to 45% by weight and the ethylene content $[(C2')_{EP-B}]$ of the propylene-ethylene random copolymer component (EP-B) is from 55 to 75% by weight.

3. The propylene-ethylene block copolymer according to claim 1, wherein a relation $[\eta]_{EP-A} \geq [\eta]_{EP-B}$ is established between the intrinsic viscosity $[\eta]_{EP-A}$ of the propylene-ethylene random copolymer component (EP-A) and the intrinsic viscosity $[\eta]_{EP-B}$ of the propylene-ethylene random copolymer component (EP-B).

4. The propylene-ethylene block copolymer according to claim 1, wherein the crystalline polypropylene portion has an intrinsic viscosity $[\eta]_P$ of 1.5 dl/g or less and a Q value, which is a molecular weight distribution (Mw/Mn) measured by GPC, of not less than 3 but less than 7.

5. A molded article made of the propylene-ethylene block copolymer according to claim 1.

* * * * *